July 26, 1960

V. DURBIN 2,946,931

PHOTOELECTRIC CONTROL SYSTEM FOR DOOR
OPERATION AND THE LIKE

Filed March 12, 1956

INVENTOR.
VERNON DURBIN
BY James and Franklin
ATTORNEYS

United States Patent Office 2,946,931
Patented July 26, 1960

2,946,931

PHOTOELECTRIC CONTROL SYSTEM FOR DOOR OPERATION AND THE LIKE

Vernon Durbin, Waban, Mass., assignor to National Pneumatic Co., Inc., Boston, Mass., a corporation of Delaware Filed Mar. 12, 1956, Ser. No. 570,902

9 Claims. (Cl. 317—124)

The present invention relates to a light sensitive system for actuating the power operator of a closure such as a door.

The use of light sensitive systems for controlling the opening and closing of a door or the like is old. Such systems generally utilize a beam of light which impinges upon a photoelectric cell to which suitable electrical connections are made. The interruption of the beam of light by the passage therethrough of a person approaching the door decreases the amount of light impinging upon the photoelectric cell. This gives rise to a change in the status of the electrical circuit in which the cell is connected. This type of arrangement, functioning only when the light impinging upon the photoelectric cell decreases below a desired value, is nevertheless subject to serious disadvantages. In particular, the locations or situations in which it can be used are limited. Such systems are not practical out-of-doors, or even indoors in places reached by bright sunlight or where the ambient light has a high intensity. In such locations the ambient light may provide sufficient illumination for the photoelectric cell so that the interruption of the artificial light beam directed upon that cell will not sufficiently reduce the illumination thereof. Nor is it practical to adjust the control circuit to take care of this situation, since the intensity of sunlight varies as the day progresses, is different on different days because of atmospheric conditions, and on a given day may vary from minute to minute because of the passage of clouds over the sun. These factors would make necessary an almost continuous, and hence completely unfeasible, adjustment of the control circuit if this system is to function properly.

Moreover, even if at a given instant the system is properly adjusted to take into account the ambient light, and even when the systems are located in places where ambient light is not a problem, the interruption of the artificial beam of light quite frequently does not actually reduce the amount of light which impinges upon the photoelectric cell. For example, if a person wearing a white coat or a white shirt should interrupt that beam, it often occurs that the reflection of light from such a white coat or skirt back to the photoelectric cell will result in an overall increase in the illumination thereof rather than a decrease. The same effect can be observed when a truck carrying highly reflective articles such as metal sheets interrupts the beam. This situation is particularly prevalent where the source of artificial illumination and the photoelectric cell are located adjacent one another, the beam passing from the source of illumination to a mirror and then reflected back to the photoelectric cell. The reflective metal sheet or white shirt in the beam then merely functions as an auxiliary mirror. The situation can also occur when the photoelectric cell and artificial light source are not thus positioned, the metal sheet or white shirt reflecting ambient light into the photoelectric cell to a degree sufficient to compensate for the loss of artificial light attendant upon the interruption of the artificial light beam. In none of these situations will the conventional control system function to open the door, since in none of these situations will the illumination of the photoelectric cell be reduced sufficiently to cause the control circuit to operate as designed.

In addition, the control circuits of the prior art have in general been characterized by at least a moderate degree of electronic complexity. It is well known that the elements employed in electronic circuits, and especially vacuum tubes, leave much to be desired in the way of reliability. Hence repair and adjustment of such circuits is often required. Even where qualified personnel are readily available, this represents a source of considerable trouble and dissatisfaction. Door control units, however, are often installed in locations where electronically skilled personnel are not readily available. For example, a bakery or a warehouse where automatic door operation is desired will not ordinarily have persons with those skills on their payroll. The installations are usually made and serviced by ordinary electricians who are adequately skilled in installing wiring but who are not qualified to "trouble shoot" on an electronic circuit when the latter does not operate properly. Accordingly the manufacturers of photoelectric door operating systems are all too frequently called upon to send engineers to remote locations where their products have been installed in order to find out why the systems are not working properly and to adjust them so that they will work properly. It is clear that this represents a substantial expense to the manufacturer, and a substantial source of delay to the customer. It is not uncommon for a system to be out of operation for a period of several weeks while waiting for a qualified serviceman to arrive.

The system of the present invention avoids the above mentioned drawbacks. The power closure for the door or the like is actuated in accordance with the illumination of a photoelectric cell, but in a manner different from that employed in prior art systems. Instead of having the control circuit sensitive to the absolute value of illumination of the cell and actuated when that illumination falls below a given value, the control circuit in the system of the present invention is sensitive to changes in the illumination of the photoelectric cell, whether those changes are in the direction of increased or decreased illumination, substantially independently of the absolute values thereof, and is preferably made sensitive to the rate at which those changes take place, only rapid changes serving to actuate the power closure. Hence the system will work under almost all conditions and in almost all locations, and without necessity for adjustment to correspond to different locations or changes in the overall illumination at those locations. An artificial beam of light impinging upon the photoelectric cell is still employed, and when that beam is interrupted so as to reduce the illumination on the cell in an abrupt manner, as when a person walks into the beam, the system will function to cause the door to open. Since only a change of illumination is involved, the amount of ambient light which impinges upon the cell at the moment when the beam is thus interrupted is to all intents and purposes immaterial. Thus the system will function just as well out-of-doors as indoors in a dimly illuminated hallway. Moreover, if the interruption of the beam should be by a reflective object, such as a white shirt in bright sunlight or a steel sheet, the illumination of the cell will ordinarily increase and this change in illumination in an increasing direction will also actuate the control circuit and cause the door to open.

Moreover, it has been found that in the system of the present invention the use of vacuum tubes may be completely dispensed with, and the circuit elements and circuitry employed may be sufficiently simple and reliable so that long continued use even under the most adverse circumstances may reliably be expected. Of course, the system of the present invention could be employed with circuitry involving vacuum tubes without departing from the broader aspects thereof, but the fact that it can be embodied in a commercially useable circuit without vacuum tubes represents a significant advantage.

To the accomplishment of the above, and to such other objects as may hereinafter appear, the present invention relates to a light sensitive control system as defined in the appended claims and as described in the appended claims, taken together with the accompanying drawings, in which:

Figure 1:
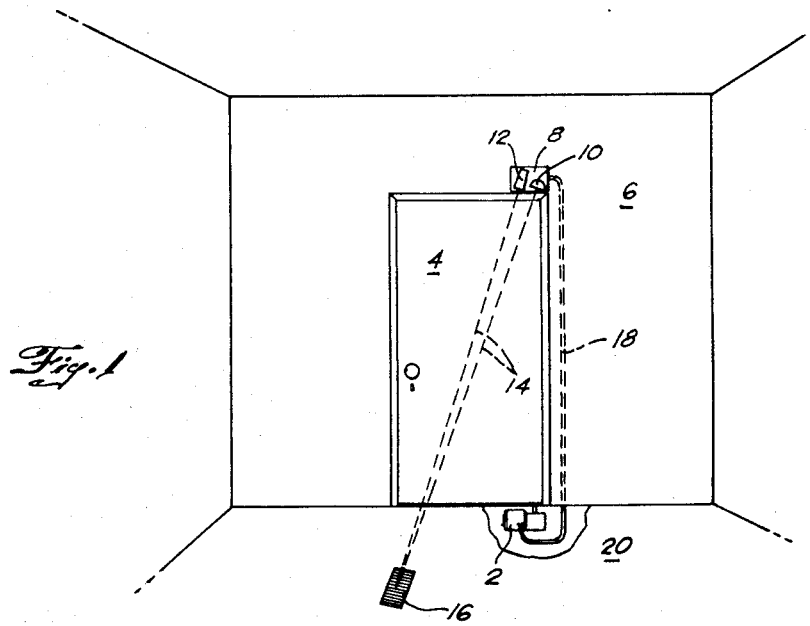
Fig. 1 is a pictorial representation of a typical installation with which the present invention may be used.

The present invention is here disclosed for controlling the operation of a motor 2 operatively connected to a door 4 to open and close the same. It will be understood, however, that while this represents an important application in which the present invention may be used, the invention is not limited thereto but may be employed to control many other types of operations.

As here specifically disclosed, there is mounted on the wall 6 in which the door 4 is positioned, and above the door 4, a housing 8 which includes a source of illumination 10 and a photoelectric cell 12 positioned side by side and oriented so that a beam of light (indicated by the broken lines 14) emanates from the light source 10, is directed downwardly and forwardly to a reflector 16 positioned in the floor 20, and then travels back up to the photoelectric cell 12, the beam 14 being so oriented that when a person or object approaches the door 4 that beam will be interrupted. The housing 8 also contains the circuitry of the system of the present invention, to be described below in detail, and electrical connections 18 extend from the housing 8 to the motor 2, the latter being here shown as housed within the floor 20 beneath the door 4, in order to control the operation of the latter.

Optically the system as thus far described may take a wide variety of forms. The illumination source 10 may be an ordinary six-volt headlamp energized from any suitable source of power and the beam 14 which emanates therefrom may be directed by suitable lenses and/or reflectors so as to take the desired path. The reflector 16 may advantageously comprise a metal plate recessed in the floor 20 and provided with a series of angular surfaces so inclined as to reflect the beam 14 back toward the cell 12 in the proper direction. The cell 12 is preferably of the photo-conductive type, utilizing cadmium sulfide as its sensitive element, such a cell having the characteristic that its electrical resistance varies inversely with respect to the amount of light impinging thereupon.

Figure 2:
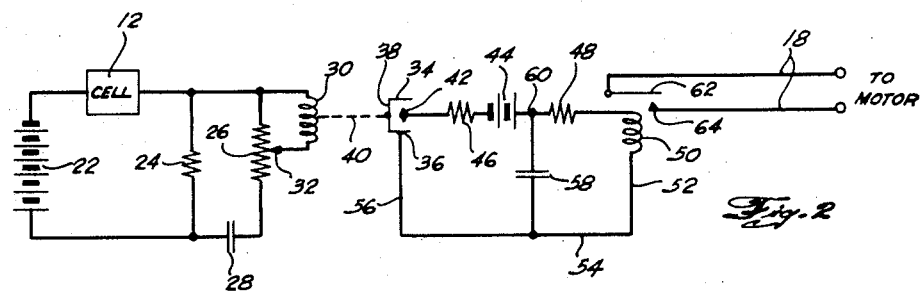
Fig. 2 is a diagram of one type of control circuit embodying the present invention.

Turning now to Fig. 2, which discloses one type of control circuit adapted to function in accordance with the present invention, the cell 12 is connected to a D.C. source 22, and in series therewith is a resistor 24. Connected in shunt with the resistor 24 is a second resistor 26 and a capacitor 28. Connected across a predetermined portion of the resistor 26 is the coil 30 of a sensitive relay, a movable tab 32 being provided on the resistor 26 so that the energization of the coil 30 may be adjusted. The coil 30 is operatively connected to a pair of separated contacts 34 and 36 which are electrically connected together at 38, the operative connection being indicated by the broken line 40. The operative connection is effective to move the contacts 34 and 36 in one direction or the other depending upon the direction in which the coil 30 is energized. Positioned between the contacts 34 and 36, normally separated therefrom, but engageable by one or the other, depending upon the direction in which those contacts are moved, is a fixed contact 42. One type of instrument particularly effective for use as the sensitive relay 30, 34, 36, 38, 40, 42 is a galvanometer type relay of known construction in which the coil 30 is positioned in a magnetic field to move in one direction or the other depending upon the direction of its energization, the contacts 34 and 36 being carried around therewith.

The fixed contact 42 of the sensitive relay is connected to a D.C. source 44 via a resistor 46. The other end of the D.C. source 44 is connected to the movable contacts 34 and 36 via resistor 48, relay coil 50, and leads 52, 54 and 56. A condenser 58 is connected between lead 54 and a point 60 between the D.C. source 44 and the resistor 48. The relay coil 50, when energized, causes movable relay contact 62 to engage with fixed relay contact 64, thus closing the circuit 18 to the motor 2.

Under normal circumstances the contacts 34 and 36 of the sensitive relay will be separated from the contact 42 thereof. Current will then flow only from the D.C. source 22 through the photoelectric cell 12 and the resistor 24. The magnitude of that current will be determined by the value of the D.C. source 22, which may, purely by way of example, be any place between 45 and 100 volts, the value of the resistor 24, which may be 15,000 ohms, and the resistance of the cell 12, which will be determined by the intensity of the light impinging thereon. A typical cell 12 may have a resistance of 30,000 ohms at normal ambient illumination or when it is provided with a collimator to exclude ambient light and the beam 14 impinges thereon, the cell 12 having perhaps a minimum resistance of 500 ohms when it is located out-of-doors in bright sunlight. The only variable in this circuit, it will be noted, is the resistance of the cell 12, and for any given illumination condition the resistance of the cell 12 will therefore control the amount of current flowing in the loop 12, 24, 22.

Under steady state conditions, when the illumination of the cell 12 remains constant, no current will flow through the resistor 26 since direct current is blocked by the capacitor 28. The capacitor 28 may have a value between 20 and 100 mfd. and the resistor 26 may be variable, as shown, between values of 10,000 and 150,000 ohms.

When, however, the illumination of the cell 12 changes either downwardly, as when the beam 14 is interrupted in conventional fashion, or upwardly, as when bright ambient light might be reflected onto the cell 12 via a white shirt or metal sheet, the resistance of the cell 12 will change and consequently the current flowing in the loop 12, 24, 22 will change. If the intensity of light decreases, the current will increase. This change in current in the loop 12, 24, 22 will to some extent be passed by the capacitor 28, so that current will then flow through the coil 30 to the tap 32 and then through a portion of the resistor 26 and the capacitor 28, the direction of this current being determined by whether the current in the loop 12, 24, 22 is increasing or decreasing. Hence the contacts 34 and 36 will be moved in one direction or the other in accordance with the direction of current flow through the coil 30.

The value of capacitor 28 and of the resistor 26, the latter being adjusted via the tap 32, will determine the time constant of the relay circuit, and since the resistor 26 is variable that time constant can be varied. If the time constant is too high the charging time of the capacitor 28 will be so great that even radical changes in the illumination of the cell 12 will not provide sufficient energization to the coil 30 to permit one or the other of the movable contacts 36 to engage with the fixed contact 42 of the sensitive relay. On the other hand, if the time constant is too low the charging of the capacitor 28 will be so short that even very gradual changes in the illumination of the cell 12, such as might be caused by the passage of a cloud over the sun, would provide sufficient energization to the coil 30 so as to actuate the sensitive relay. A suitable comprise must be reached. The actual adjusted value of the resistor 26 may vary from installation to installation, and for different purposes, but for normal door operation a time constant of 1/10 second has been found to be eminently satisfactory. By that is meant that the pulse produced in the coil 30 from expected and normal variations in illumination of the cell 12 should last for at least 1/10 of a second before the sensitive relay will be actuated.

When either of the contacts 34 or 36 engage with contact 42 a circuit is closed through the relay coil 50, the motor contacts 62 and 64 engage, and the motor 2 is energized to perform its door moving operation. The capacitor 58 is provided for time delay purposes, so that once the relay coil 50 has been actuated it will remain energized for a desired period of time, such as that required to open the door and hold it open until a person has passed through the doorway. Thereafter, provided that the sensitive relay contacts 34, 36 have disengaged from the fixed contact 42, the motor 2 will be de-energized and the door may be closed by means of a spring. Of course, it will be understood that various other arrangements for controlling the door cycle may be used.

Returning to the operation of the control system, it will be appreciated that the sensitive relay will normally be actuated in two sequential and opposite senses for each door operation. If the actuation is through the interruption of the beam 14 and consequent decrease in illumination of the cell 12, which will result when a person walks into the beam 14, as soon as that person walks out of the beam 14 the illumination of the cell 12 will increase, and since this causes a change in the current of the loop 12, 24, 22 in an opposite sense from that previously discussed, the sensitive relay 30 will again be energized, but in an opposite sense. This, in effect, gives the control circuit 2 separate chances to be actuated, and if for some reason the circuit should malfunction when the beam is first interrupted, there is a likelihood that it might well function when the person steps out of the beam. Moreover, this mode of operation also ensures that the timing of the operation of the motor 2 as determined by the capacitor 58 will normally occur when a person leaves the beam 14 since his departure from that beam will give rise to a re-energization of the relay coil 50 and hence a recharging of the capacitor 58. This mode of operation illustrates that the use of a pair of movable contacts 34 and 36 is not absolutely essential to the practice of the present invention. However, it is preferred that the pair of contacts be provided because they make for greatly improved reliability of operation.

The same line of reasoning applies, of course, in the case where the system is initially actuated through an increase in the amount of light impinging upon the cell 12.

In the circuit here specifically disclosed, the coil 30 of the sensitive relay may have a resistance of 1000 ohms and a current carrying capacity of 100 microamps. The resistor 46 may be 580 ohms, the resistor 48 may be 10,000 ohms, the D.C. source 44 may produce 90 volts, the capacitor 58 may be 120 mfd. and the coil 50 have a resistance of 5000 ohms. These and other circuit values, it will be understood, are purely exemplary, and the invention is not to be construed as limited thereto.

Figure 3:
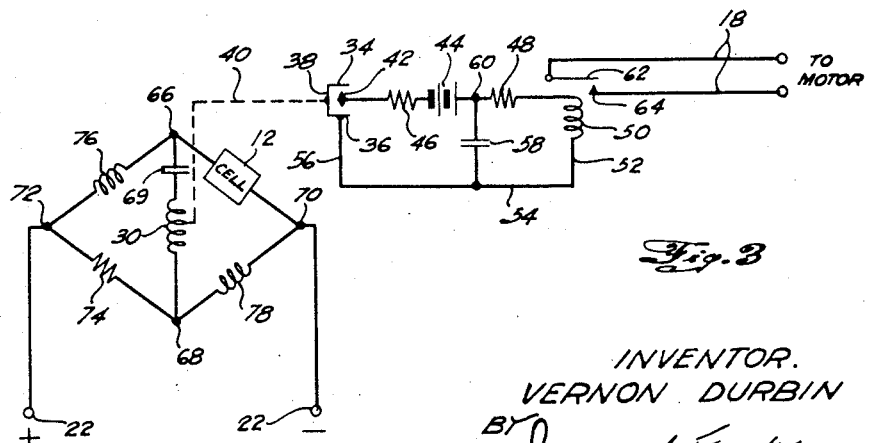
Fig. 3 is a diagram of an alternate type of control circuit embodying the present invention.

In the circuit of Fig. 3 the coil 30 of the sensitive relay is connected between points 66 and 68 of a Wheatstone bridge circuit with a capacitor 69 in series therewith, the points 70 and 72 of that bridge circuit being connected to their D.C. source 22. The cell 12 is positioned in one arm of the bridge and the opposite arm is formed of a resistor 74 to balance the cell 12 at a given condition. The other arms are defined by inductors 76 and 78. When the illumination of the cell 12 remains constant current will flow through the arms of the bridge, the inductances 76 and 78 permitting the flow of steady current therethrough. Even if the bridge is unbalanced the capacitor 69 will prevent the flow of current therethrough. If, however, the illumination of the cell 12 should change, the inductances 76 and 78 will resist the passage of changing current therethrough, and that changing current will largely travel through cell 12, the capacitor 69, the sensitive relay coil 30, and the resistor 74. In the system of Fig. 3, therefore, as in the system of Fig. 2, the coil 30 will be effectively energized only when changes in the illumination of the cell 12, and the direction of energization will be determined by whether the illumination of the cell 12 is increasing or decreasing.

It will be noted that in either of the disclosed circuits are any electron tubes employed, the circuitry is exceedingly simple, employs but a minimal number of components, and uses only sturdy and dependable components. Consequently the entire control circuit may be mounted in a very small space, thus minimizing the size of the housing 8, may be very inexpensively produced, and will operate reliably for long periods of time and under adverse operating conditions.

In addition, since the system is sensitive only to changes in the illumination of the cell 12, and to such changes whether they are in an increasing or decreasing sense, the system of the present invention can be employed in locations and situations and for purposes where conventional photoelectric control equipment is unsuitable. Moreover, even in conventional situations the system of the present invention will give rise to improved operation, since it will function satisfactorily in cases where conventional systems would fail.

While but a limited number of embodiments of the present invention have been here disclosed, it will be apparent that many variations may be made in the details thereof, without departing from the spirit of the invention as defined in the following claims.

I claim:

1. A control system comprising a photoelectric cell, a control device adapted to be actuated in a given sense in response to a change in energization thereof whether that change in energization is in an increasing or decreasing direction, said control device being operatively connected to a power element to actuate the latter, and an operative connection between said photoelectric cell and said control device, said operative connection being sensitive to a change in the illumination of said cell and effective to cause energization of said control device only when a change occurs in the illumination of said cell, and means for permitting effective energization of said control device only when the rate of change of illumination of said photoelectric cell exceeds a given value.

2. A control system comprising a photoelectric cell, a relay device having control contacts actuated by energization of said relay device whether that energization is in a positive or negative sense, said control contacts being operatively connected to a power element to actuate the latter, and a connection between said photoelectric cell and said relay device, said operative connection being sensitive to a change in the illumination of said cell and effective to cause energization of said relay device only when a change occurs in the illumination of said cell, and means for permitting effective energization of said control device only when the rate of change of illumination of said photoelectric cell exceeds a given value.

3. A power closure control comprising a photoelectric cell connected to a first circuit to control the energization thereof in accordance with the illumination of said cell, a second circuit including a relay device having control contacts actuated by energization of said relay device whether that energization is in a positive or negative sense, said control contacts being operatively connected to a power closure to actuate the latter, and a connection between said first and second circuits sensitive to a change in the energization of said first circuit and effective to cause energization of said relay device only when a change occurs in the energization of said first circuit, and means for permitting effective energization of said control device only when the rate of change of illumination of said photoelectric cell exceeds a given value.

4. The power closure control of claim 3, in which said power closure comprises a motor having an energizing circuit including a switch, motor relay means operatively connected to said switch for closing the same, and said control contacts being operatively connected to said motor relay means so as to actuate the latter to close said switch when said control contacts are actuated in said given sense.

5. A power closure control comprising a photoelectric cell connected to a first circuit to control the energization thereof in accordance with the illumination of said cell, said first circuit comprising said cell, a source of electric energy and an impedance means connected in series, a second circuit including a relay device having control contacts actuated by energization of said relay device whether that energization is in a positive or negative sense, said second circuit comprising said relay device and an adjustable impedance means in series therewith, said control contacts being operatively connected to a power closure to actuate the latter, and a connection between said first and second circuits sensitive to a change in the energization of said first circuit and effective to cause energization of said relay device only when a change occurs in the energization of said first circuit, said connection comprising a capacitor electrically connected in series between said second circuit and said impedance means in said first circuit.

6. The power closure control of claim 5, in which said power closure comprises a motor having an energizing circuit including a switch, motor relay means operatively connected to said switch for closing the same, and said control contacts being operatively connected to said motor relay means so as to actuate the latter to close said switch when said control contacts are actuated in said given sense.

7. A power closure control comprising a photoelectric cell connected to a first circuit to control the energization thereof in accordance with the illumination of said cell, a second circuit including a relay device having control contacts actuated by energization of said relay device whether that energization is in a positive or negative sense, said control contacts being operatively connected to a power closure to actuate the latter, and a connection between said first and second circuits sensitive to a change in the energization of said first circuit and effective to cause said energization of said relay device only when a change occurs in the energization of said first circuit, said photoelectric cell being connected in one arm of a balanced bridge circuit connected to a D.C. source, the opposite arm of said bridge comprising a resistor, the other two arms of said bridge comprising inductors, said relay device being connected in series with a capacitor across said bridge between the ends remote from said D.C. source of the arms comprising said cell and said resistor.

8. The power closure control of claim 7, in which said power closure comprises a motor having an energizing circuit including a switch, motor relay means operatively connected to said switch for closing the same, and said control contacts being operatively connected to said motor relay means so as to actuate the latter to close said switch when said control contacts are actuated in said given sense.

9. A control system comprising a photoelectric cell, a control device operatively connected to a power element to actuate the latter whenever said control device is effectively energized, and an operative energizing connection between said photoelectric cell and said control device, said operative energizing connection being sensitive to changes in the illumination of said cell both in increasing and decreasing senses and effective to cause effective energization of said control device when said cell illumination increases and when it decreases, and means for permitting effective energization of said control device only when the rate of change of illumination of said photoelectric cell exceeds a given value.

References Cited in the file of this patent
UNITED STATES PATENTS

| | | |
|---|---|---|
| 666,737 | Coleman | Jan. 29, 1901 |
| 1,949,689 | Lamb | Mar. 6, 1934 |
| 1,985,563 | Fitzgerald | Dec. 25, 1934 |
| 2,016,036 | Fitzgerald | Oct. 1, 1935 |
| 2,054,380 | Lamb | Sept. 15, 1936 |
| 2,057,384 | Lamb | Oct. 13, 1936 |
| 2,145,021 | Berges | Jan. 24, 1939 |
| 2,697,803 | Eadie | Dec. 21, 1954 |